US009717001B2

(12) United States Patent
Toyota

(10) Patent No.: US 9,717,001 B2
(45) Date of Patent: Jul. 25, 2017

(54) AUTHENTICATION SYSTEM AND AUTHENTICATION METHOD

(71) Applicant: Yukinari Toyota, Tokyo (JP)

(72) Inventor: Yukinari Toyota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 102 days.

(21) Appl. No.: 14/643,016

(22) Filed: Mar. 10, 2015

(65) Prior Publication Data

US 2015/0264569 A1    Sep. 17, 2015

(30) Foreign Application Priority Data

Mar. 17, 2014  (JP) .................................. 2014-052910

(51) Int. Cl.
*H04L 29/06*    (2006.01)
*H04W 12/06*    (2009.01)
*G06F 21/34*    (2013.01)
*H04W 4/00*     (2009.01)

(52) U.S. Cl.
CPC ............ *H04W 12/06* (2013.01); *G06F 21/34* (2013.01); *H04W 4/008* (2013.01)

(58) Field of Classification Search
CPC .............................. H04W 12/06; G06F 21/31
See application file for complete search history.

(56) References Cited

U.S. PATENT DOCUMENTS

| | | | | |
|---|---|---|---|---|
| 9,182,933 B2 * | 11/2015 | Nanjo | ................... | G06F 3/1292 |
| 2004/0172535 A1 * | 9/2004 | Jakobsson | ............ | G06Q 20/341 |
| | | | | 713/168 |
| 2007/0171088 A1 * | 7/2007 | Sato | ........................ | G06F 21/32 |
| | | | | 340/686.6 |
| 2011/0115679 A1 * | 5/2011 | Kong | ..................... | H01Q 1/243 |
| | | | | 343/702 |
| 2013/0237155 A1 * | 9/2013 | Kim | ...................... | H04W 12/06 |
| | | | | 455/41.2 |
| 2013/0272520 A1 * | 10/2013 | Noda | .................... | H04L 9/0861 |
| | | | | 380/44 |
| 2014/0040628 A1 * | 2/2014 | Fort | ........................ | G06F 21/34 |
| | | | | 713/182 |

FOREIGN PATENT DOCUMENTS

| | | |
|---|---|---|
| JP | 2007-228554 | 9/2007 |
| JP | 2007-249425 | 9/2007 |

* cited by examiner

*Primary Examiner* — Izunna Okeke
*Assistant Examiner* — Hee Song
(74) *Attorney, Agent, or Firm* — Oblon, McClelland, Maier & Neustadt, L.L.P.

(57) ABSTRACT

An authentication system, an authentication device, and an authentication method are provided. The authentication system includes a mobile device and an authentication device. The mobile device includes a storage unit, and a code-for-authentication generator. The authentication device includes an output device configured to output the prescribed code to be used for generating the code for authentication, an input device configured to obtain the code for authentication output from the mobile device, an authenticator generation unit, and an authentication processing unit configured to determine whether the user at the mobile device is authenticated. The authentication device includes an output device, an input device, and processing circuitry. The authentication method performed by the authentication device includes outputting, reading, and determining whether the user at the mobile device is authenticated.

16 Claims, 11 Drawing Sheets

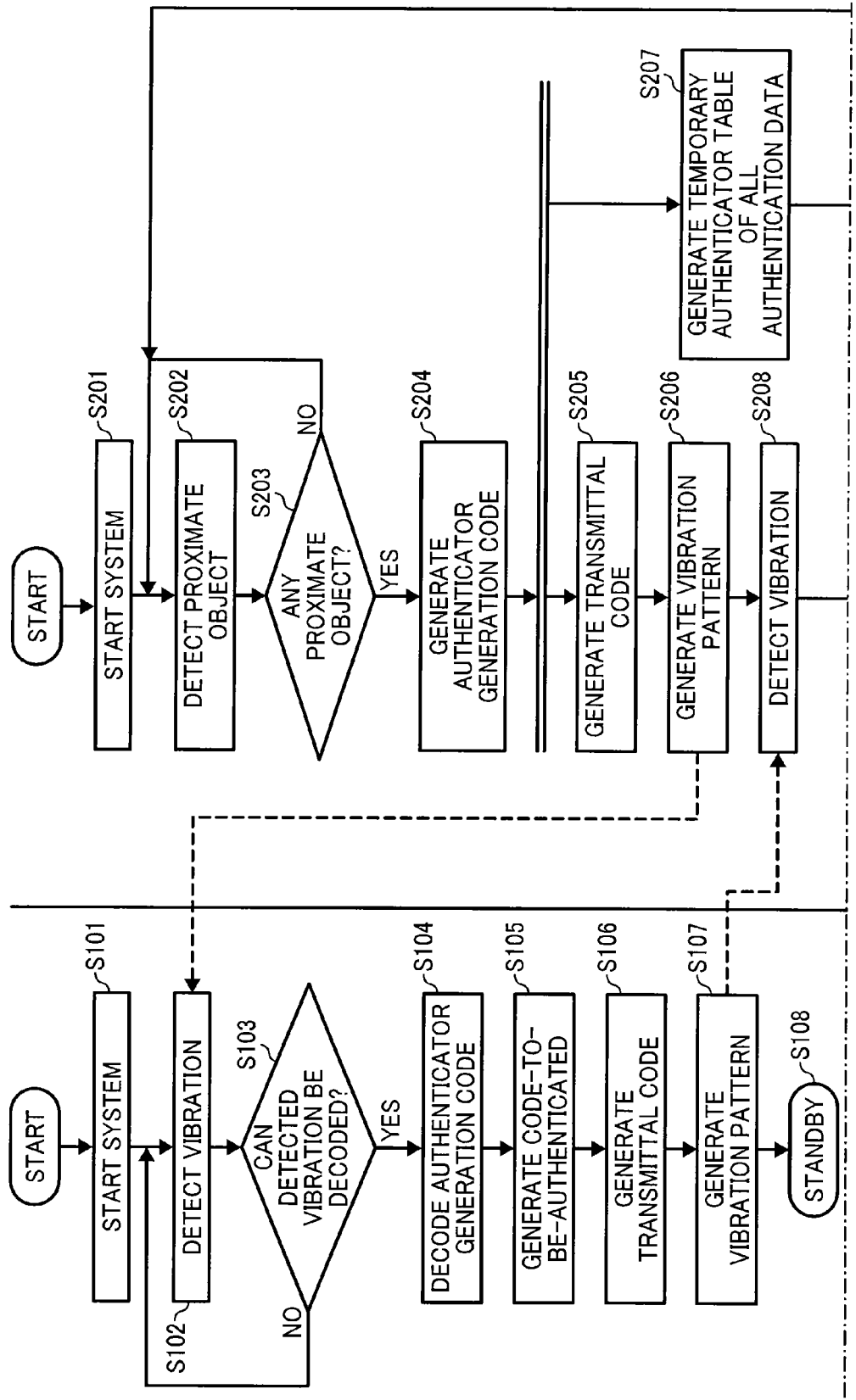

FIG. 5A
AUTHENTICATOR GENERATION CODE

| 0 × 12 | 0 × 34 | 0 × 56 | 0 × 78 |

FIG. 5B
DATE DATA

| '2' | '0' | '1' | '3' | '1' | '2' | '3' | '1' |

FIG. 5C
AUTHENTICATION DATA (VARIABLE-LENGTH STRING)

FIG. 5D
AUTHENTICATION DB

| USER ID | AUTHENTICATION DATA |
|---------|---------------------|
| USER 1  | abc⋯b              |
| USER 2  | bcd⋯g              |
| USER 3  | cde⋯u              |
| ⋮       | ⋮                  |

FIG. 5E
TEMPORARY AUTHENTICATOR (FIXED-LENGTH BIT PATTERN)

FIG. 5F
TABLE

| USER ID | AUTHENTICATION DATA | TEMPORARY AUTHENTICATOR |
|---------|---------------------|-------------------------|
| USER 1  | abc⋯b              | 0100⋯1100              |
| USER 2  | bcd⋯g              | 1101⋯0011              |
| USER 3  | cde⋯u              | 0101⋯1001              |
| ⋮       | ⋮                   | ⋮                      |

FIG. 7A

AUTHENTICATION DB

| AUTHENTICATION DATA |
|---|
| 1001abc···b |
| 1002bcd···g |
| ⋮ |
| 7003cde···u |
| 7004cde···u |
| ⋮ |

FIG. 7B

TABLE

| AUTHENTICATION DATA | TEMPORARY AUTHENTICATOR |
|---|---|
| 0001abc···b | 0100···1100 |
| 0002bcd···g | 1101···0011 |
| 0003cde···u | 0101···1001 |
| ⋮ | ⋮ |
| 6999ghj···u | 0101···1101 |

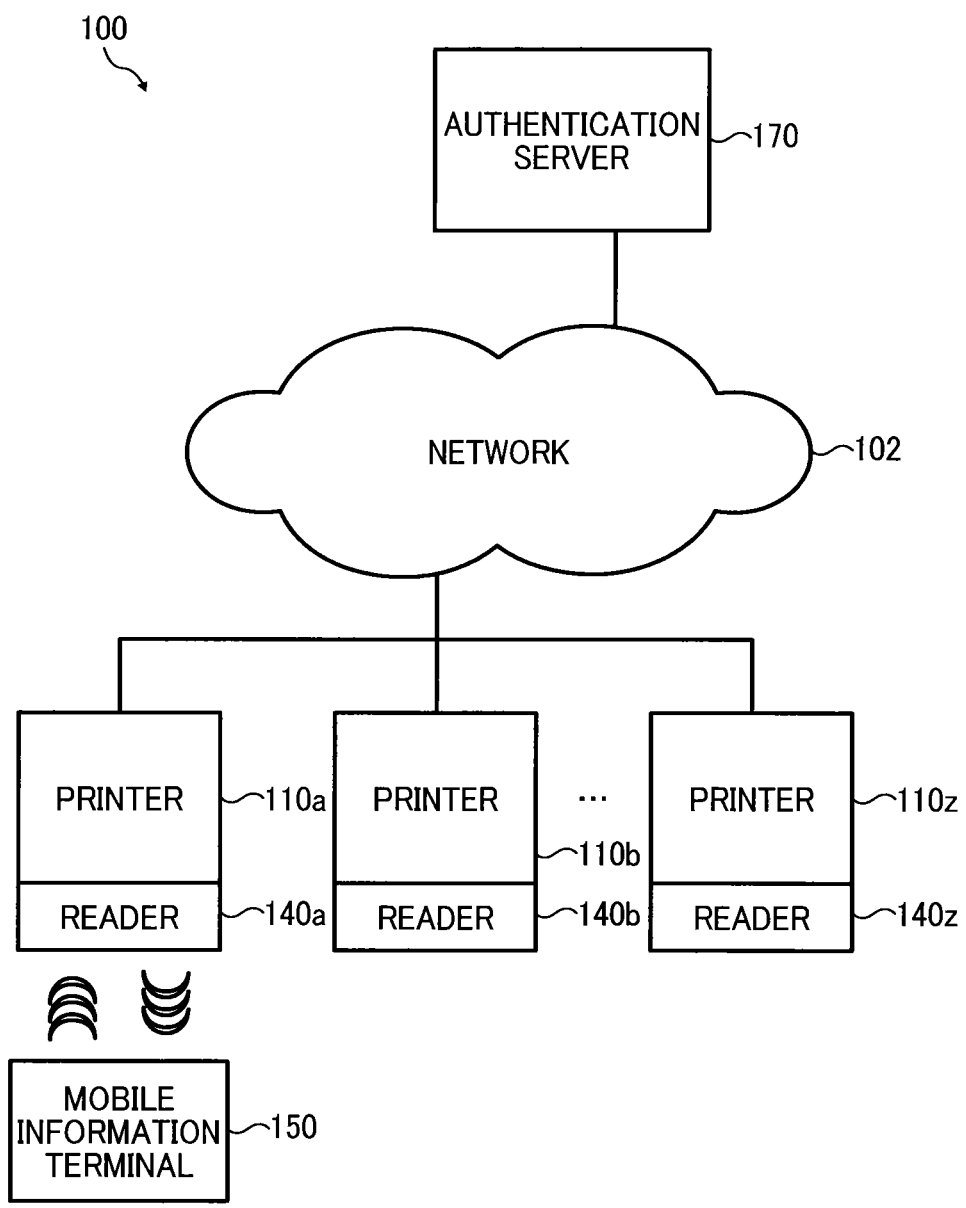

FIG. 10

TABLE

| TEMPORARY AUTHENTICATOR | FIXED-LENGTH BIT PATTERN | | |
|---|---|---|---|
| USER ID | AUTHENTICATION DATA | TEMPORARY AUTHENTICATOR | INVALIDITY FLAG |
| USER1 | abc···b | 0100···1100 | False |
| USER2 | bcd···g | 1101···0011 | False |
| USER3 | cde···u | 0101···1001 | True |
| ⋮ | ⋮ | ⋮ | ⋮ |

AUTHENTICATION SYSTEM AND AUTHENTICATION METHOD

CROSS-REFERENCE TO RELATED APPLICATION

This patent application is based on and claims priority pursuant to 35 U.S.C. §119(a) to Japanese Patent Application No. 2014-052910, filed on Mar. 17, 2014, in the Japan Patent Office, the entire disclosure of which is hereby incorporated by reference herein.

BACKGROUND

Technical Field

Example embodiments of the present invention generally relate to an authentication system and an authentication method.

Background Art

Conventionally, authentication systems are known that record the authentication data of a user on an integrated circuit (IC) card or mobile information terminal and perform the authentication of the user when such an IC card or mobile information terminal is brought into contact with the reader of an information appliance. In such systems, IC cards or mobile devices such as mobile information terminals, and readers adopt a short-range radio communication system, and exchange authentication data therebetween.

In recent years, as a technology of connecting information appliances that are physically proximate to each other through the network, the technology of encoding communication information such as an Internet protocol (IP) address for identifying a device and transmitting the encoded communication information through a special communication channel using flash patterns, light emission patterns, sound patterns, or vibration patterns is known. When such flash patterns, light emission patterns, sound patterns, or vibration patterns are used, the range that a signal can reach is limited.

SUMMARY

Embodiments of the present invention described herein provide an authentication system, an authentication device, and an authentication method. The authentication system includes a mobile device and an authentication device configured to authenticate the user at the mobile device. The mobile device includes a storage unit configured to store authentication data of a user, and a code-for-authentication generator configured to generate a code for authentication using a prescribed code and the authentication data. The authentication device includes an output device configured to output the prescribed code to be used for generating the code for authentication in response to detection of the mobile device, an input device configured to obtain the code for authentication output from the mobile device that is generated at the mobile device, an authenticator generation unit configured to obtain authentication data of one or more registered users from a memory, and generate an authenticator for each one of the one or more registered users, by using the prescribed code and authentication data of corresponding one of the one or more registered users, and an authentication processing unit configured to match the code for authentication output from the mobile device with the authenticator that is generated for each one of the one or more registered users to determine whether the user at the mobile device is authenticated. The authentication device includes an output device configured to output a prescribed code in response to detection of a mobile device, an input device configured to obtain a code for authentication output from the mobile device that is generated at the mobile device using the prescribed code and authentication data of a user stored in the mobile device, and processing circuitry configured to obtain authentication data of one or more registered users from a memory, generate an authenticator for each one of the one or more registered users, by using the prescribed code and authentication data of corresponding one of the one or more registered users, and match the code for authentication output from the mobile device with the authenticator that is generated for each one of the one or more registered users to determine whether the user at the mobile device is authenticated. The authentication method performed by the authentication device includes outputting a prescribed code in response to detection of a mobile device, obtaining a code for authentication output from the mobile device that is generated at the mobile device using the prescribed code and authentication data of a user stored in the mobile device, reading authentication data of one or more registered users from a memory, generating an authenticator for each one of the one or more registered users, by using the prescribed code and authentication data of corresponding one of the one or more registered users, and matching the code for authentication output from the mobile device with the authenticator that is generated for each one of the one or more registered users to determine whether the user at the mobile device is authenticated.

BRIEF DESCRIPTION OF THE SEVERAL VIEWS OF THE DRAWINGS

A more complete appreciation of exemplary embodiments and the many attendant advantages thereof will be readily obtained as the same becomes better understood by reference to the following detailed description when considered in connection with the accompanying drawings.

FIGS. 4A and 4B are a flowchart of the user authentication processes performed between a printer and a mobile information terminal of an authentication print system, according to a first example embodiment of the present invention.

FIGS. 5A to 5F depict examples of the data structure of the data used by an authentication print system according to a first example embodiment of the present invention.

FIGS. 7A and 7B depict examples of the data structure of the data used by an authentication print system according to a modification of an example embodiment of the present invention.

FIG. 8 is a schematic diagram of the configuration of an authentication print system according to a second example embodiment of the present invention.

FIG. 10 depicts an example of the data structure of the data used by an authentication print system according to a second example embodiment of the present invention.

Figure 1:
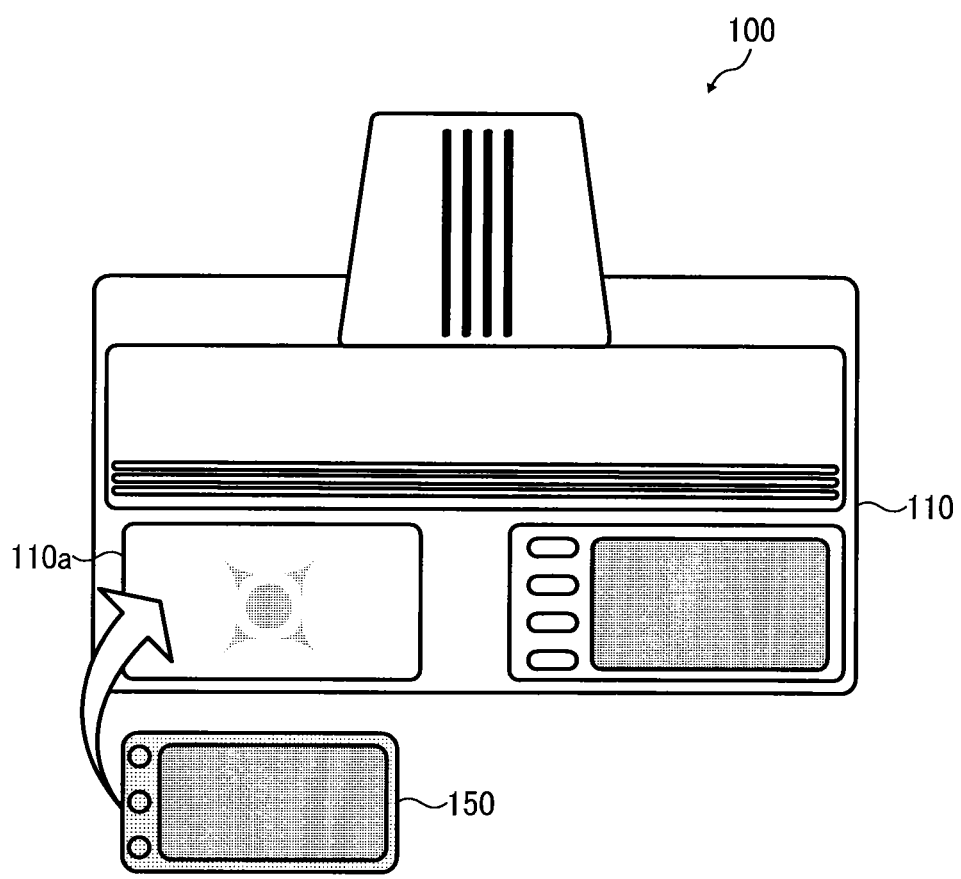
FIG. 1 is a schematic diagram of the configuration of an authentication print system according to a first example embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits (ASICs), field programmable gate arrays (FPGAs) computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Some example embodiments of the present invention are described below, but no limitation is indicated therein and various applications and modifications may be made without departing from the scope of the invention.

[First Example Embodiment]

The first example embodiment is described below with reference to an authentication print system 100 that includes a mobile information terminal 150 and a printer 110. The mobile information terminal 150 serves as a mobile device that is carried by a system user, and the printer 110 serves as an authentication device that authentication processes. The operation of the printer 110 is controlled according to a result of the authentication processes.

FIG. 1 is a diagram illustrating an outline of the configuration of an authentication print system 100 according to the first example embodiment of the present invention. As illustrated in FIG. 1, the authentication print system 100 includes a printer 110 that cannot be used unless authenticated, and a mobile information terminal 150 that is carried by a user and stores authentication data on behalf of the user.

In the authentication print system 100 according to the present example embodiment of the present invention, the communication between the printer 110 and the mobile information terminal 150 is performed by mechanical vibration patterns. When the mobile information terminal 150 is placed on a placing board 110a provided for the printer 110, the printer 110 and the mobile information terminal 150 can communicate with each other as the communication units of the printer 110 and the mobile information terminal 150 contact. Data for authentication is exchanged between the printer 110 and the mobile information terminal 150 through mechanical vibration patterns. Accordingly, the authentication of a user is performed.

In the example embodiment described herein, the authentication print system 100 includes the printer 110 that controls the operation based on the result of the authentication processes, and the mobile information terminal 150 that serves as a mobile device carried by a user. However, no limitation is indicated therein, and the configuration of the authentication system may include any other information processing devices such as a scanner, copier, multifunction peripheral (MFP), fax machine, projector, and digital camera in place of a printer, or other types of device such as an access control device in other example embodiments. The mobile device may be the mobile information terminal 150 including a smartphone, tablet computer, and personal digital assistance (PDA), or any other devices that are carried by an individual such as a laptop computer and a special-purpose key.

In the example embodiment described herein, the printer 110 serves as an authentication processing device that performs authentication processes, and an authentication-required device whose operation is controlled based on the result of the authentication processes. The authentication device, the authentication processing device, and the authentication-required device may be configured as separate devices. For example, a system may be provided including an authentication server that performs authentication processes and a printer whose operation is controlled based on the result of the authentication processes. Alternatively, an authentication device may be provided as an external device in close proximity to a printer.

Figure 2:
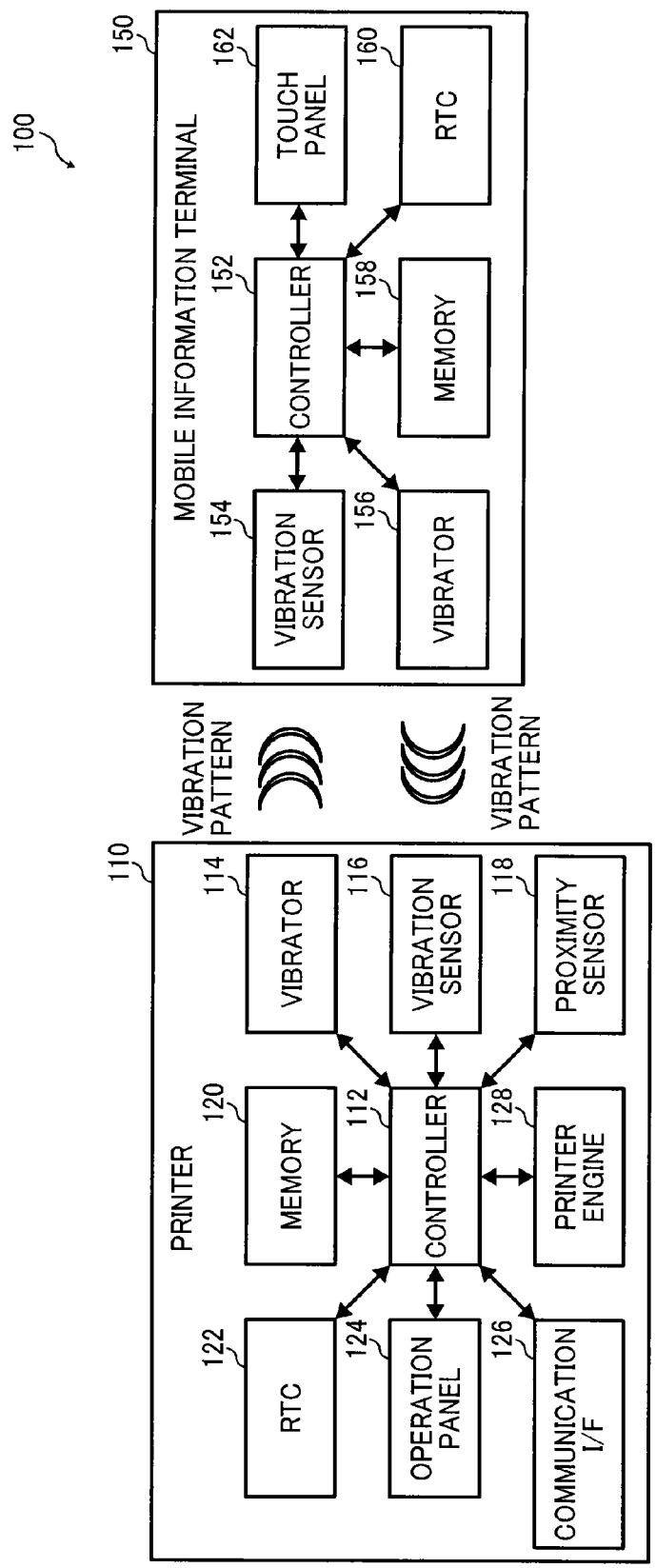
FIG. 2 is a block diagram of the hardware configuration of an authentication print system according to a first example embodiment of the present invention.

FIG. 2 is a block diagram of the hardware configuration of the authentication print system 100 according to the first example embodiment of the present invention. As illustrated in FIG. 2, the printer 110 includes a vibrator 114, a vibration sensor 116, and a proximity sensor 118, each of which is controlled by a program. In a similar manner, the mobile information terminal 150 includes a vibration sensor 154 and a vibrator 156, each of which is controlled by a program.

The vibrator 114 of the printer 110 generates vibration patterns at a communication unit that the mobile information terminal 150 contact, to transfer the generated vibration patterns to the vibration sensor 154 provided for the mobile information terminal 150. No limitation is indicated, but the vibrator 114 may be any vibrator that can control the intensity of vibration, frequency, and time, or any vibration motor that can only control the on-off of the vibration at a prescribed cycle. The vibrator 114 may use the motive power of the print engine or the like of the printer 110.

The vibration sensor 116 of the printer 110 detects the vibration patterns that are generated by the vibrator 156 provided for the mobile information terminal 150 and are transferred through the communication unit that the mobile information terminal 150 contact. No limitation is indicated, but the vibration sensor 116 may be an acceleration sensor using piezoresistance, or a displacement detector in which a spring, a movable part, and a switch are combined.

On the other hand, the vibration sensor 154 that is provided for the mobile information terminal 150 detects the vibration patterns that are generated by the vibrator 114 provided for the printer 110 and are transferred through the communication unit that the printer 110 contact. In a similar manner to the vibration sensor 116, the vibration sensor 154 may be an acceleration sensor or a displacement detector. The vibrator 156 of the mobile information terminal 150 also generates vibration patterns at the communication unit where the mobile information terminal 150 contacts the printer 110, to transfer the generated vibration patterns to the vibration sensor 116 provided for the printer 110. In a similar manner to the vibration 114, the vibrator 156 may be any vibration or vibration motor. Such a vibration motor or acceleration sensor as described above are provided for a mobile information terminal such as a known smartphone. By making use of such existing hardware, cost may be reduced.

The proximity sensor 118 of the printer 110 is arranged near the communication unit to monitor an approaching object at all times or on a regular basis. In particular, the proximity sensor 118 detects that the mobile information terminal 150 is approaching the proximity sensor 118 to start authentication procedures. In the example embodiment described below, the proximity sensor 118 detects the proximity of the mobile information terminal 150 as an event to trigger authentication procedures. No limitation is indicated, but the proximity sensor 118 may be an infrared sensor that detects infrared reflection, or a magnetic sensor that detects changes in magnetic flux.

When the communication unit of the mobile information terminal 150 (i.e., the housing of the vibrator 156 and the vibration sensor 154) touches the communication unit of the printer 110 (i.e., the placing board for which the vibrator 114, the vibration sensor 116, and the proximity sensor 118 are provided), the proximity sensor 118 of the printer 110 operates to start direct communication through vibration patterns.

In the example embodiment described below, the mobile information terminal 150 is detected by the proximity sensor 118 when the mobile information terminal 150 is placed on the placing board 110a of the printer 110. Then, authentication procedure starts as the vibrator 114 of the printer 110 generates vibration patterns. However, a method of detecting a request for authentication procedure is not limited to the configuration as described above. In other example embodiments, a request for authentication procedure may be detected by the printer 110 as follows. Firstly, the vibrator 114 generates vibration patterns on a regular basis, and the generated vibration patterns are detected by the mobile information terminal 150. Then, the mobile information terminal 150 generates vibration patterns in response to the detected vibration patterns, and the vibration patterns generated by the mobile information terminal 150 are detected by the printer 110 as a request for authentication procedure. In such cases, the proximity sensor 118 may be omitted.

In the example embodiment described below, the vibrator 114 and the vibration sensor 116 are used to transfer data for authentication through mechanical vibration patterns. In such a configuration, physical contact is necessary between the communication unit of the mobile information terminal 150 and the communication unit of the printer 110 in order to transfer mechanical vibration patterns. This configuration is preferred to prevent disguise of a sender, or to prevent tampering of the communication data.

However, the direct communication method that is used by the printer 110 and the mobile information terminal 150 is not limited to methods in which mechanical vibrations are used, and any other various types of communication methods may be used as long as the direct communication between the printer 110 and the mobile information terminal 150 can be established. The term direct communication indicates a model in which an output device and an input device communicate with each other without being mediated by a relay device. It is desired that a direct communication method that is adopted by the printer 110 and the mobile information terminal 150 is a communication method where communication is performed through a special communication channel. When communication is performed through such a special communication channel, the range that a signal can reach is limited, and a signal can be transmitted only to a contacted or nearest communication unit or a signal can be received only from a contacted or nearest communication unit. In other words, it is desired to be configured such that only one device can be arranged in the range that a signal can reach.

For example, a method may be adopted that performs communication via optical patterns using a light emitting element such as light-emitting diode (LED) or cold-cathode tube and a light receiving element such as illuminance sensor or photodiode. In such cases, it is desired to be configured such that only a device whose communication unit has a prescribed relative position can communicate with a printer via optical patterns and the physical proximity between the communication unit of the printer 110 and the communication unit of the mobile information terminal 150 is maintained. Such a configuration is achieved, for example, by increasing the directivity of the emitted or received light. Alternatively, a method may be adopted that performs communication via sound-wave patterns using a sound wave generator such as loudspeaker and a sound wave receiver such as microphone. In a similar manner to the cases of optical patterns described above, it is desired to be configured such that only a device whose communication unit has a prescribed relative position can communicate with a printer via optical patterns. Such a configuration is achieved, for example, by increasing the directivity of the generated or received sound waves.

A mobile information terminal such as a known smartphone includes an LED, an illuminance sensor, a loudspeaker, and a microphone. By making use of such existing hardware, cost may be reduced. Alternatively, different direct communication methods may be used between the communication channel from the printer 110 to the mobile information terminal 150 and the communication channel from the mobile information terminal 150 to the printer 110.

As illustrated in FIG. 2, the hardware configuration of the printer 110 further includes a controller 112, a memory 120, a real time clock (RTC) 122, an operation panel 124, a communication interface (I/F) 126, and a printer engine 128, and these elements are controlled by a control program stored, for example, in the ROM of the controller 112.

The RTC 122 outputs the data of date, and normally indicates the same date as that of the RTC 160 of the mobile information terminal 150. The controller 112 receives the output data of the date at the time when proximity is detected. In the example embodiment described below, the controller 112 receives the date from the RTC 122. However, no limitation is indicated therein, and the date may be obtained from an external time providing system through the communication I/F in other example embodiments.

The memory 120 stores an authentication database (DB) in which the authentication data of all the users registered in the printer 110 is written. The memory 120 includes a hard disk drive (HDD), a solid state disk (SSD), and a nonvolatile memory. In the example embodiment described below, the memory 120 of the printer 110 stores the authentication DB. However, no limitation is indicated therein, and an external authentication server that is connected to the printer 110 through a communication line may store the authentication DB in other example embodiments. Moreover, such an external authentication server may be connected to a plurality of printers through a communication line, and the authentication DB may be shared or synchronized among the printers in other example embodiments.

The operation panel 124 receives instructions such as printing instructions from a user, and displays the results of processes. The operation panel 124 includes a display device such as a display device and an input device such as buttons. The communication I/F 126 connects the printer 110 to the network such as the local area network (LAN), and is used to receive printing data. The communication I/F 126 may be a network interface card (NIC) or a wireless network adaptor. The printer engine 128 performs image formation based on the received printing data, and forms an image on a transferring member such as paper.

In the example embodiment described below, the operation panel 124 of the printer 110 become available after printing data is received through the communication I/F 126 and then a user is authenticated by using the mobile information terminal 150. Then, as instructed by the user through the operation panel 124, the printer engine 128 performs printing operation.

The controller 112 includes hardware such as a central processing unit (CPU), a random access memory (RAM), and a read only memory (ROM). The CPU reads a control program from the ROM or other storage device such as a HDD or an SSD and develops the read control program in the workspace provided by the RAM, to realize several functions as will be described later.

As illustrated in FIG. 2, the hardware configuration of the mobile information terminal 150 further includes a controller 152, a memory 158, an RTC 160, and a touch panel 162, and these elements are controlled by a control program stored, for example, in the ROM of the controller 152.

The RTC 160 outputs the data of date, and normally indicates the same date as that of the RTC 122 of the printer 110. The controller 152 receives the output data of the date on which the authentication process started. In the example embodiment described below, the mobile information terminal 150 includes the RTC 160. However, no limitation is indicated therein, and the date may be obtained from an external time providing system through the communication I/F or the date may be input by a user through an input device such as the touch panel 162 in other example embodiments.

The memory 158 stores the authentication data of a user who is registered in advance such that the user is authenticated by using the mobile information terminal 150. The memory 158 may be a removable media such as a nonvolatile memory and an SD card (registered trademark), or an auxiliary storage device such as a HDD and an SSD. The authentication data may be prepared in advance by a user or administrator, or the authentication data may be input by a user each time when the user wishes to start authentication processes. The touch panel 162 is composed of, for example, a display and buttons, and is used to input the authentication data of a user.

The controller 152 includes hardware such as a CPU, a RAM, and a ROM. The CPU reads a control program from the ROM or other storage device such as an external nonvolatile memory, an HDD, an SSD, and a removable media and develops the read control program in the workspace provided by the RAM, to realize several functions as will be described later.

Figure 3:
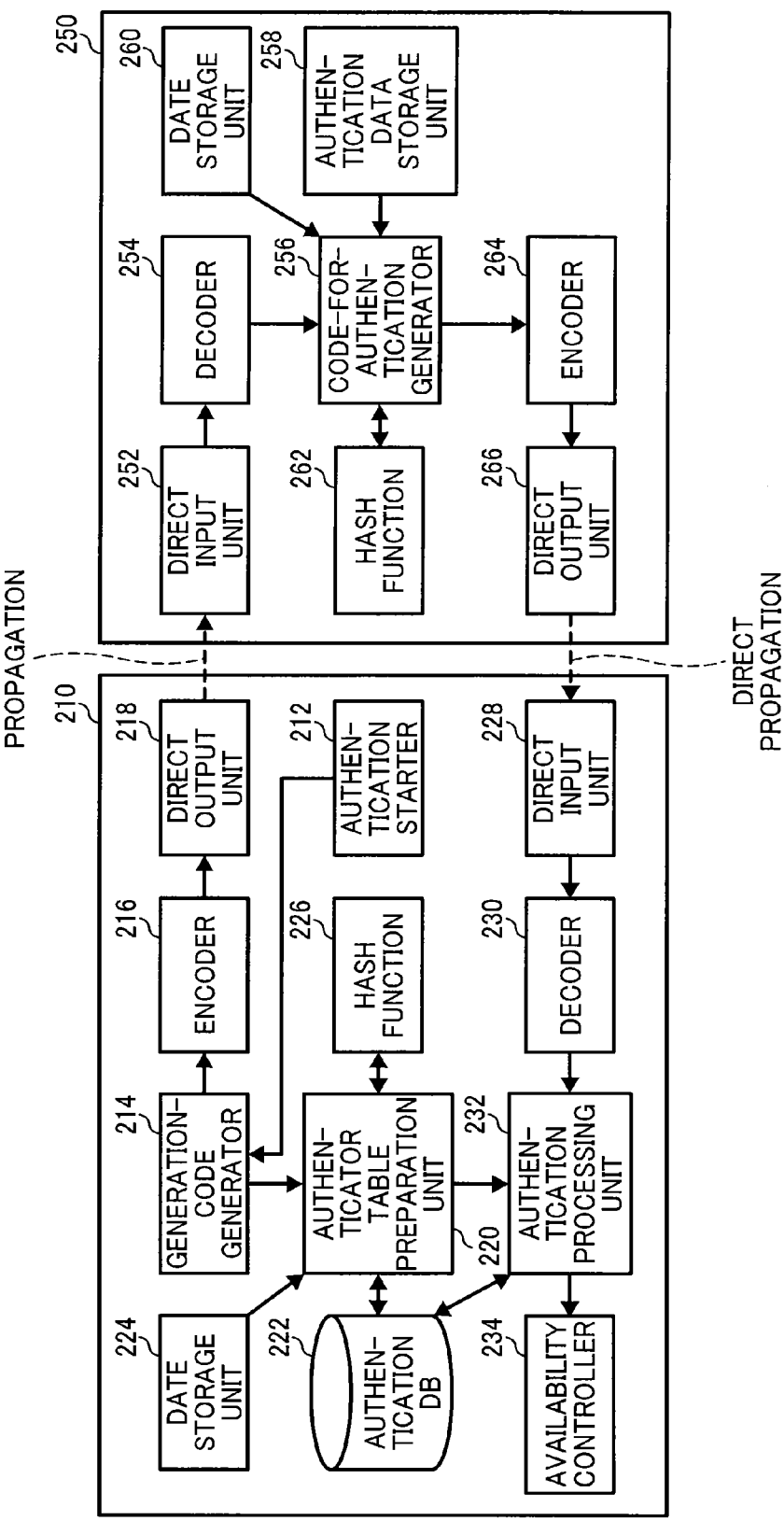
FIG. 3 is a functional block diagram of an authentication print system according to a first example embodiment of the present invention.

FIG. 3 is a functional block diagram of the authentication print system 100 according to the first example embodiment of the present invention. The functional blocks of the printer 110 are firstly described below with reference to FIG. 3. As illustrated in FIG. 3, the functional blocks 210 of the printer 110 include an authentication starter 212, a generation-code generator 214, an encoder 216, a direct output unit 218, an authenticator table preparation unit 220, an authentication DB 222, a date storage unit 224, and a hash function 226.

The authentication starter 212 serves as a trigger detection unit for detecting an event that triggers authentication processes and starting the authentication processes. In the example embodiment described below, the authentication starter 212 includes the proximity sensor 118 illustrated in FIG. 2 and a program for processing the output of the proximity sensor 118.

The generation-code generator 214 serves as a generator that generates an authenticator generation code used as source code for generating a temporary authenticator, as will be described later. No limitation is indicated, but the generation-code generator 214 is configured in the controller 112 by a pseudorandom number generation program such as the Mersenne Twister, the multiply-with-carry, and the Lagged Fibonacci generator. Alternatively, the generation-code generator 214 may be configured by hardware random number generator.

The encoder 216 performs encoding by adding redundancy for error correction to the authenticator generation code generated by the generation-code generator 214, and by embedding clock signals on the authenticator generation code. No limitation is indicated, but the encoder 216 is configured in the controller 112 by a transmittal code generation program in which an error correction code algorithm such as the Reed-Solomon code and the Bose-Chaudhuri-Hocquenghem (BCH) code and a conversion algorithm such as the 8b/10b code conversion are combined. Alternatively, the encoder 216 may be configured by hardware such as a circuit. In the Reed-Solomon code, for example, a codeword of 24 bits including four 4-bit symbols and two 4-bit redundant symbols may be used.

The direct transmitter 218 converts the authenticator generation code that is generated by the generation-code generator 214 and then is encoded by the encoder 216 into an electrical signal, and drives the vibrator 114 to transmit vibration patterns to the mobile information terminal 150 that requests authentication. No limitation is indicated, but the direct output unit 218 includes the vibrator 114 illustrated in FIG. 2 and a driver or program that drives the vibrator 114.

After transmitting the authenticator generation code to the mobile information terminal 150 as vibration patterns, the printer 110 receives a response from the mobile information terminal 150. The authenticator table preparation unit 220 serves as an authenticator generation unit that generates data for determining whether or not the response from the mobile information terminal 150 is to be accepted or rejected. More specifically, the authenticator table preparation unit 220 prepares temporary authenticators for all the users of the printer 110 based on the authenticator generation codes generated by the generation-code generator 214.

The authentication DB 222 is a database in which authentic users of the printer 110 are registered, and stores the authentication data of all the users of the printer 110. The authentication data is uniquely assigned to each of the users, and is used to generate a temporary authenticator for each of the users together with the authenticator generation code.

The date storage unit 224 serves as an authenticating-side synchronous numbering unit that obtains the date on which the authentication process started (at the time when proximity is detected) from the RTC 122 and obtains synchronization information. Here, the date is synchronization information used for synchronization with the mobile information terminal 150, and is used to generate a temporary authenticator for each of the users together with the authenticator generation code and the authentication data of the users. If such date data is used, synchronization can be performed by using an existing RTC available at a known information processing device or mobile information terminal. Accordingly, the cost may be reduced.

The hash function 226 is a function of difficulty in inverse operation from output to input. The hash function 226 receives the authenticator generation code, the date data, and the authentication data of a user, and outputs a temporary authenticator of fixed length. The hash function 226 is shared with the mobile information terminal 150, and is configured to output the same data for the same input. No limitation is indicated, but the hash function 226 is configured in the controller 112 by a hash function program such as the Secure Hash Algorithm-1 (SHA-1), the SHA-3, the SHA-256, and the message digest algorithm-5 (MD-5).

The date storage unit 224 outputs the same value as that of the to-be-authenticated-side synchronous numbering unit during a prescribed period, and maintains difficulty in performing inverse operation from the temporary authenticator to the authentication data during the period as the value changes after the period. In the example embodiment described herein, the synchronization information is obtained on a daily basis, and the same value is output as the synchronization information until the day changes. However, no limitation is indicated herein, and the period may be extended or divided into shorter periods by hour or minute according to the length of the temporary authenticator or the desired level of security.

The authenticator table preparation unit 220 according to the present example embodiment inputs the authenticator generation codes generated by the generation-code generator 214, the date data stored in the date storage unit 224, and authentication data registered in authentication DB 222 to the hash function 226, and prepares temporary authenticators for the authentication data of all the users. The prepared temporary authenticators are stored, for example, in data base such as the authentication DB 222, as a table of the authentication data. The authenticator table preparation unit 220 is configured in the controller 112 by a program that obtains authentication data from the authentication DB 222 and activates the hash function 226 to obtain calculation results.

After the vibration patterns are transmitted from the printer 110 to the mobile information terminal 150, the mobile information terminal 150 sends back a response to the printer 110 in parallel with the preparation of the table of the temporary authenticators. In order to deal with such a response, the functional block 210 further includes a direct input unit 228, a decoder 230, and an authentication processing unit 232.

The direct input unit 228 drives the vibration sensor 116 to detect the vibration patterns of the mobile information terminal 150, and converts the detected vibration patterns into an electrical signal. In the example embodiment described below, the direct input unit 228 includes the vibration sensor 116 illustrated in FIG. 2 and a circuit or program for converting the output of the vibration sensor 116 into a digital signal.

The decoder 230 reproduces the embeded clock from the received signal of the vibration patterns to decode the code, and performs error detection and error correction based on the added redundancy. No limitation is indicated, but the decoder 230 is configured in the controller 112 by a transmittal code decoding program in which an error correction code algorithm such as the Reed-Solomon code and a conversion algorithm such as the 8b/10b encoding are combined to be adapted to the algorithm on the mobile information terminal 150 side. Alternatively, the decoder 230 may be configured by hardware such as a circuit.

The authentication processing unit 232 matches at least some of the code for authentication that is received by the direct input unit 228 as vibration patterns and then is decoded by the decoder 230 with the table of the temporary authenticator that is prepared by the authenticator table preparation unit 220 and then is stored in the authentication DB 222, to determine whether or not the authentication is successful. In the example embodiment described herein, whether or not the authentication is successful is determined based on the degree of match between some of the code for authentication and the temporary authenticators in the table.

More specifically, the authentication processing unit 232 determines whether any of the temporary authenticators in the table matches some of the code for authentication to a prescribed degree or greater before the entirety of the code for authentication is received from the mobile information terminal 150. When there is a temporary authenticator that matches some of the code for authentication to a prescribed degree or greater, the authentication processing unit 232 determines that the authentication is successful. Accordingly, whether or not an additional code is necessary with reference to the degree of match is determined, and the length of time required for the authentication can be adjusted according to the error rate in communication. When the error rate in communication is small, the length of time required for the authentication is shortened. The authentication processing unit 232 is configured in the controller 112 by a table searching program such as of a management system of related database.

In the present example embodiment, as illustrated in FIG. 3, the functional blocks 210 of the printer 110 further include an availability controller 234, and the availability controller 234 controls the functions of the printer 110 based on a result of the authentication processes performed by the authentication processing unit 232. The availability controller 234 controls the user interface provided on the operation panel 124 of the printer 110 according to the result of the authentication processes performed by the authentication processing unit 232, and provides an authenticated user with access to the functions.

To an operator who has failed in the authentication process, a message indicating the failure in authentication is presented on the display of the operation panel 124, and no further operation related to function such as printing and scanning is accepted. To an user who has been successfully authenticated, a window for accessing function is presented on the display of the operation panel 124, and operation related to function such as printing, scanning, photocopying, and facsimile is accepted as authorized.

Next, the functional blocks of the mobile information terminal 150 are described below with reference to FIG. 3. As illustrated in FIG. 3, the functional blocks 250 of the mobile information terminal 150 include a direct input unit 252, a decoder 254, a code-for-authentication generator 256, an authentication data storage unit 258, a date storage unit 260, a hash function 262, an encoder 264, and a direct output unit 266.

The direct input unit 252 drives the vibration sensor 154 to detect the vibration patterns that carry the authenticator generation code from the printer 110, and converts the detected vibration patterns into an electrical signal. No limitation is indicated, but the direct input unit 252 includes the vibration sensor 154 illustrated in FIG. 2 and a circuit or program for converting the output of the vibration sensor 154 into a digital signal.

The decoder 254 reproduces the embeded clock from the electrical signal of the vibration patterns received by the direct input unit 252 to decode the code, and performs error detection and error correction based on the redundancy added on the transmission side. No limitation is indicated, but the decoder 254 is configured in the controller 152 by a transmittal code decoding program that is adapted to the printer 110. Alternatively, the decoder 254 may be configured by hardware such as a circuit.

The code-for-authentication generator 256 generates a code for authentication based on the authenticator generation code that is decoded by the decoder 254 upon being received as vibration patterns by the direct input unit 252 from the printer 110. The authentication data storage unit 258 stores the authentication data assigned to a user who carries the mobile information terminal 150. Note that the authentication data is input to the mobile information terminal 150 in advance by a user who has received the authentication data from the system administrator or other administrators. Here, the authentication data that is stored in the authentication data storage unit 258 is used to generate a code for authentication for each of the users together with the authenticator generation code.

The date storage unit 260 serves as a to-be-authenticated-side synchronous numbering unit that obtains the date on which the authentication process started (at the time when vibrations of the printer are detected) from the RTC 160 and obtains synchronization information. Here, the date is used to generate a code for authentication for each of the users together with the authenticator generation code and the authentication data of the users.

The hash function 262 is a function of difficulty in inverse operation from output to input. The hash function 262 receives the authenticator generation code, the date data, and the authentication data of a user, and outputs a code for authentication of fixed length. The hash function 262 is shared with the printer 110, and is configured to output the same data for the same input.

The code-for-authentication generator 256 according to the present example embodiment inputs the authenticator generation code received from the printer 110, the date data stored in the date storage unit 260, and the authentication data stored in the authentication data storage unit 258 into the hash function 262, to generate a code for authentication. Because the hash function 262 is shared with the printer 110, as long as appropriate authentication data is stored, the same code for authentication as the temporary authenticator prepared on the authenticating side can be obtained. No limitation is indicated, but the code for authentication generator 256 is configured in the controller 152 by a program.

The encoder 264 performs encoding by adding redundancy for error correction to the code for authentication generated by the code-for-authentication generator 256, and by embedding clock signals on the code for authentication. No limitation is indicated, but the encoder 264 is configured in the controller 152 by a transmittal code generation program whose format is adapted to the printer 110. Alternatively, the encoder 264 may be configured by hardware such as a circuit.

The direct output unit 266 converts the code for authentication that is generated by the code-for-authentication generator 256 and then is encoded by the encoder 264 into an electrical signal, and drives the vibrator 156 to transmit vibration patterns to the printer 110. No limitation is indicated, but the direct output unit 266 includes the vibrator 156 illustrated in FIG. 2 and a driver or program that drives the vibrator 156.

In the above, the hardware configuration and functional configuration of the authentication print system 100 according to the first example embodiment of the present invention have been described. Next, the user authentication processes that are performed by the authentication print system 100 according to the first example embodiment of the present invention are described in detail with reference to the flowchart illustrated in FIGS. 4A and 4B, the data structure illustrated in FIGS. 5A to 5F, and the data structure illustrated in FIGS. 6A to 6C.

Figure 4B:
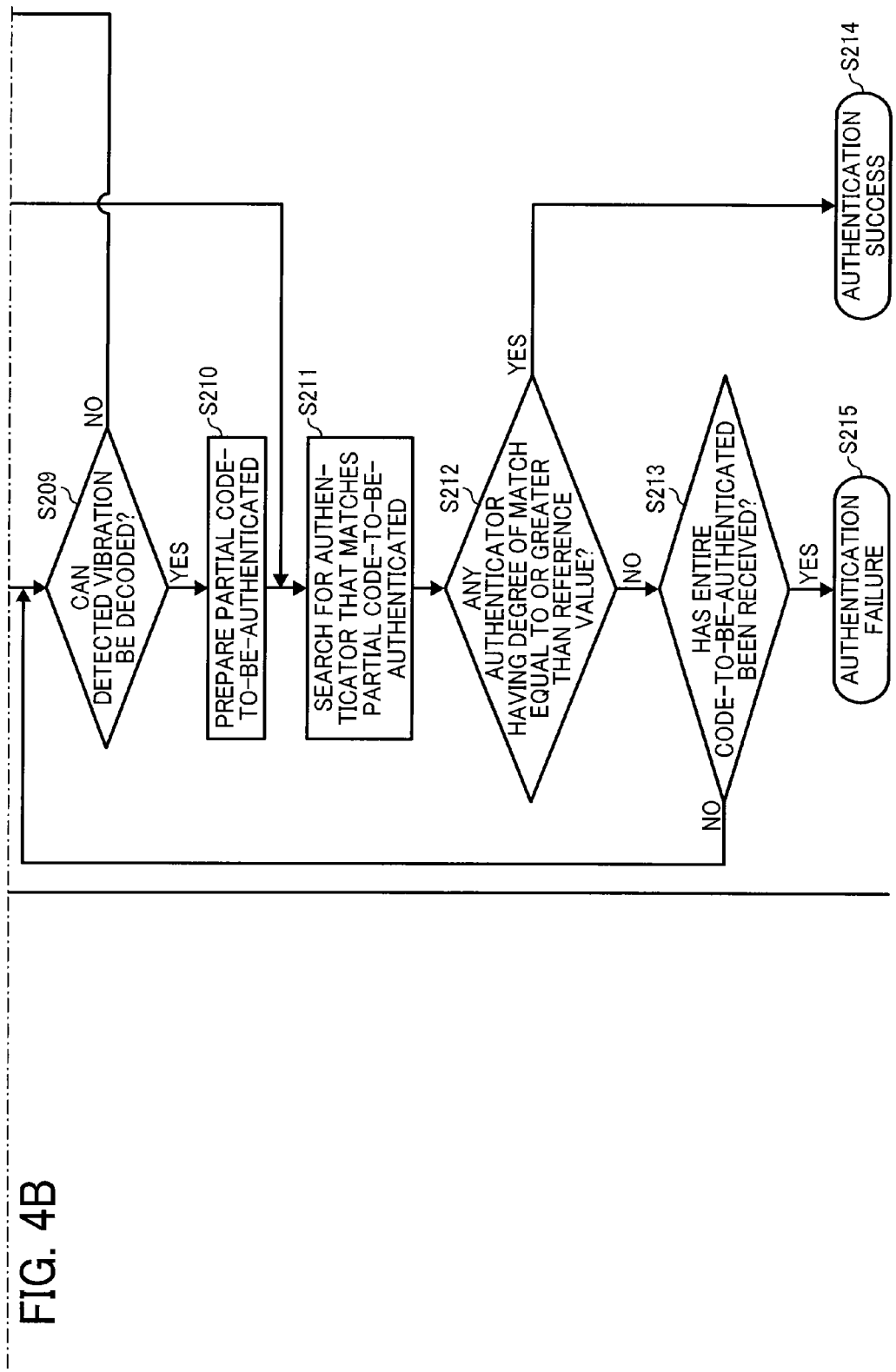

FIGS. 4A and 4B are a flowchart of the user authentication processes performed between the printer 110 and the mobile information terminal 150 of the authentication print system 100 according to the first example embodiment of the present invention. Note that the processes that are performed on the mobile information terminal 150 side (S100 to S108) are illustrated in combination with the processes that are performed on the printer 110 side (S200 to S215) in FIGS. 4A and 4B.

As illustrated in FIGS. 4A and 4B, the processes performed on the mobile information terminal 150 side start from step S100 in response to, for example, the turning-on of the power to the mobile information terminal 150. In step S101, the mobile information terminal 150 starts the system. In a similar manner, the processes performed on the printer 110 side start from step S200 in response to, for example, the turning-on of the power to the printer 110. In step S201, the printer 110 starts the system.

After the printer 110 is started, the printer 110 uses the authentication starter 212 to start detecting a proximate object in step S202. The detection of such a proximate object triggers authentication processes. The printer 110 determines whether a proximate object is present in step S203. When no proximate object is detected ("NO" in S203), the process returns to step S202 to wait for a proximate object. On the other hand, when a proximate object is detected ("YES" in S203), the process proceeds to step S204. In particular, when the mobile information terminal 150 touches the proximity sensor 118 of the printer 110, it is determined that a proximate object is present.

In step S204, the printer 110 uses the generation-code generator 214 to generate authenticator generation codes. FIG. 5A illustrates the data structure of an authenticator generation code used by the authentication print system 100 according to the first example embodiment of the present invention. The authenticator generation code illustrated in FIG. 5A is configured as a byte string of 4-byte random number.

Figure 6A:
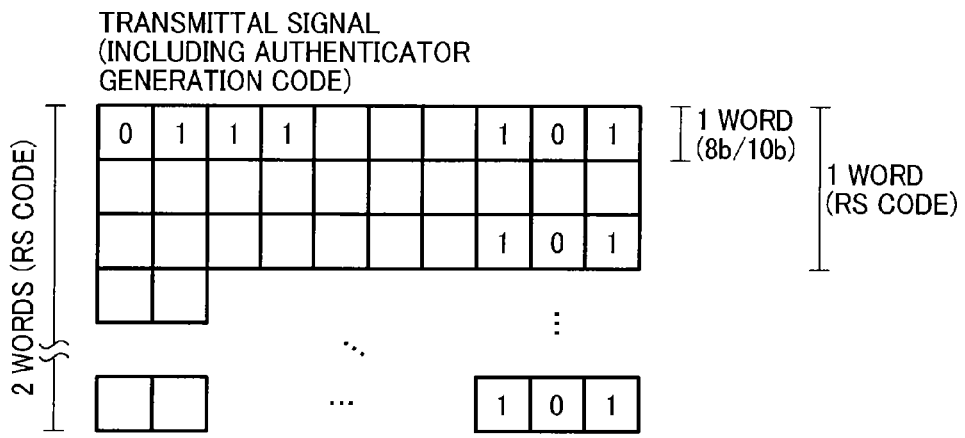
FIGS. 6A to 6C depict examples of the data structure of the data used by an authentication print system according to a first example embodiment of the present invention.

In step S205, the printer 110 uses the encoder 216 to encode an authenticator generation code by giving an error correction code thereto and embedding a clock signal thereon, and generates a transmittal code that can stably be transmitted as vibration patterns. FIG. 6A illustrates an example of the data structure of transmittal code generated by the printer 110 in the authentication print system 100 according to the first example embodiment of the present invention. The transmittal code illustrated in FIG. 6A may be configured as a 60-bit (2-word) bit patterns obtained by adding a 16-bit error correction code to a 4-byte authenticator generation code as illustrated in FIG. 5A and performing 8b/10b code conversion thereon.

In step S206, the vibrator 114 of the printer 110 uses the direct output unit 218 to generate vibration patterns indicated by the transmittal code.

Moreover, in concurrently to step S205 and step S206, the printer 110 inputs the authenticator generation codes, the date data, and the authentication data to the hash function 226, to generate temporary authenticators. Accordingly, a temporary authenticator table of the temporary authenticators and the authentication data of all the users registered in the authentication DB 222 is generated (S207).

FIG. 5B illustrates an example of the data structure of date data used by the authentication print system 100 according to the first example embodiment of the present invention. The date data of FIG. 5B is composed of 8-byte character strings (byte strings) of date described by the American Standard Code for Information Interchange (ASCII) codes.

FIG. 5C illustrates an example of the data structure of authentication data used by the authentication print system 100 according to the first example embodiment of the present invention. FIG. 5D illustrates an example of the data structure of authentication DB used by the authentication print system 100 according to the first example embodiment of the present invention. The authentication data depicted in FIG. 5C and the authentication data of each user listed in the authentication DB as depicted in FIG. 5D are composed of variable-length strings (byte strings) in which the authentication data is held. The authentication DB may be arranged as the matrix of the authentication data of all the users, but the authentication DB according to the present example embodiment is listed by user identification data.

FIG. 5E illustrates an example of the data structure of temporary authenticator used by the authentication print system 100 according to the first example embodiment of the present invention. The temporary authenticator illustrated in FIG. 5E is configured as the bit pattern of the bit of fixed length that is output from the hash function of the first example embodiment described above. The hash function according to the present example embodiment receives an authenticator generation code of fixed length, date data of fixed length, and a variable-length byte string obtained by combining variable-length authentication data, and outputs a temporary authenticator of fixed-length.

FIG. 5F illustrates an example of the data structure of a table of temporary authenticators and the corresponding data used by the authentication print system 100 according to the first example embodiment of the present invention. The table of FIG. 5F includes all the authentication data registered in the authentication DB 222 and the temporary authenticators generated from the registered authentication data. the example embodiment described herein, the table further includes the corresponding user identification data.

After the vibration patterns are generated in step S206 of FIGS. 4A and 4B, the printer 110 waits for response vibration in steps S208 and S209.

On the other hand, after the mobile information terminal 150 starts operating, the mobile information terminal 150 attempts to detect vibration by using the direct input unit 252 in step S102. In step S103, the mobile information terminal 150 detects vibration and determines whether the detected vibration can be decoded. When no vibration is detected or when it is determined that the detected vibration cannot be decoded ("NO" in S103), the process returns to the step S102 and the mobile information terminal 150 waits for vibration that can be decoded. Note that vibration other than vibration patterns, such as vibration as environmental noise, is excluded in the present example embodiment described herein.

On the other hand, when it is determined that the detected vibration can be decoded ("YES" in S103), the process proceeds to step S104. In step S104, the mobile information terminal 150 uses the decoder 254 to decode the authenticator generation code transmitted from the printer 110.

In step S105, the mobile information terminal 150 inputs the variable-length byte strings obtained by combining the authenticator generation code received from the printer 110, the date data of when the vibration was detected, and the authentication data of the user stored in the authentication data storage unit 258 to the hash function, and generates a code for authentication. In a similar manner to the temporary authenticator illustrated in FIG. 5E, the code for authentication is configured as the bit pattern of the bit of fixed length that is output from the hash function according to the present example embodiment.

Figure 6B:
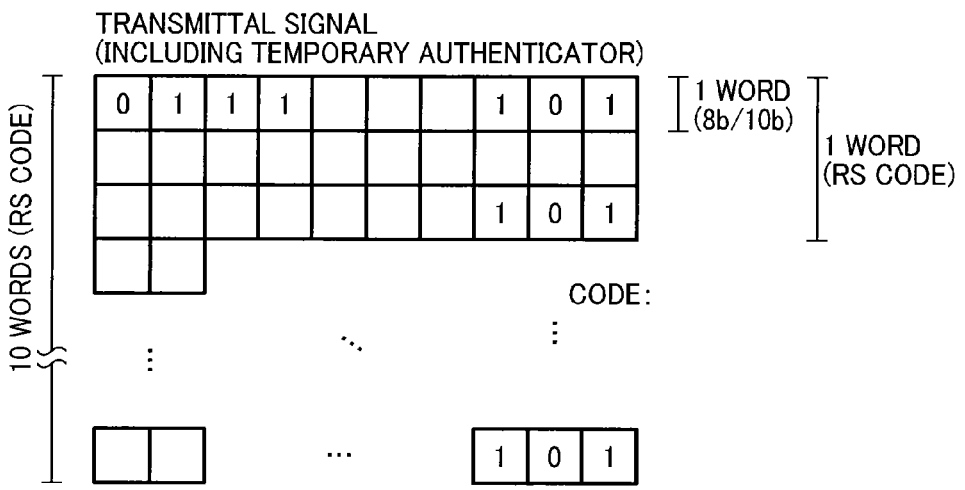

In step S106, the mobile information terminal 150 uses the encoder 264 to encode a code for authentication by giving an error correction code thereto and embedding a clock signal thereon, and generates a transmittal code that can stably be transmitted as vibration patterns. FIG. 6B illustrates an example of the data structure of transmittal code generated by the mobile information terminal 150 in the authentication print system 100 according to the first example embodiment of the present invention. The transmittal code depicted in FIG. 6B is a bit pattern of fixed bit length obtained by adding an error correction code to the bit pattern of fixed length as depicted in FIG. 5E and by performing 8b/10b code conversion thereon.

For example, when the temporary authenticator has the bit length of 160 and the Reed-Solomon code as a codeword of 24 bits including four 4-bit symbols and two 4-bit redundant symbols is used, a 80-bit error correction code is added to a temporary authenticator of bit length of 160 and 8b/10b code conversion is performed thereon. Accordingly, bit patterns of bit length of 300 are obtained.

In step S107, the mobile information terminal 150 uses the direct output unit 266 to generate vibration patterns indicated by the transmittal code, which are to be transmitted from the vibrator 156. Then, the process shifts to a standby mode in step S108.

On the printer 110 side, as described above, after the vibration patterns are generated in step S206 of FIGS. 4A and 4B, the printer 110 waits for response vibration in steps S208 and S209. In the step S208, the printer 110 attempts to detect vibration by using the direct input unit 228. In step S209, the printer 110 detects vibration and determines whether the detected vibration can be decoded. When no vibration is detected for a prescribed length of time or longer or when it is determined that the detected vibration cannot be decoded ("NO" in S209), the process returns to the step S202. When an object other than the mobile information terminal 150 is detected, the authentication starter 212 starts detecting a proximate object again.

On the other hand, when a part of the vibration patterns is detected and it is determined that the detected vibration can be decoded ("YES" in S209), the process proceeds to step S210. In step S210, the printer 110 uses the decoder 230 to decode the part of the authenticator that has already been received, and prepares a partial code for authentication.

Figure 6C:
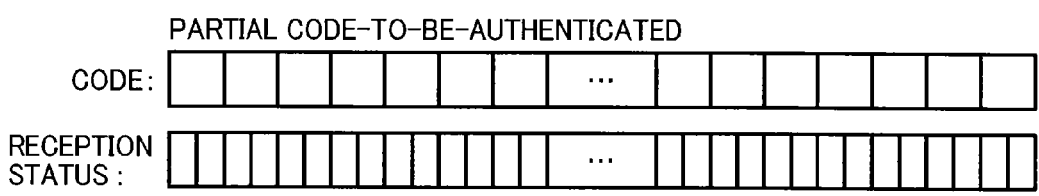

FIG. 6C illustrates an example of the data structure of partial code for authentication generated by the printer 110 in the authentication print system 100 according to the first example embodiment of the present invention. The partial code for authentication depicted in FIG. 6C is composed of a pair of the storage bit string in which the part of the code for authentication of fixed bit length that has already been received is stored and the reception-status bit string indicating the reception status of the code for authentication for each bit.

The reception-status bit string indicates the reception status of the bit patterns of the code for authentication of fixed bit length as described above. In the example embodiment described herein, 2-bit representation is adopted. "00" indicates that the bit patterns are not yet received, and "01" indicates that the reception is complete. "10" indicates that the reception is complete but an error is detected, and "11" indicates that an error is detected in the received code but the code has been corrected by an error correction code. Accordingly, when the authenticator of bit length of 160 as described above is used, the partial code for authentication depicted in FIG. 6C is composed of a pair of the storage bit string of 160 bits and the reception-status bit string of 320 bits When the decoding is to be started, all the 2 bits of the bit strings that indicates the reception status are initialized to be "00". When the transmittal code is decoded by the printer 110, the normally-received bits are written into the storage bit string, and the value of the corresponding bit in the reception-status bit string is changed accordingly. By so doing, how far the reception is complete, from which of the received bits an error is detected, and the error of which of the bits has been corrected are managed.

In step S211, the printer 110 searches the table for an authenticator that matches the partial code for authentication to the highest degree. In this search, the partial code for authentication where an error has been corrected by an error correction code may be used. The bit patterns of "01" (reception is complete) and "11" (reception is complete upon correcting the code) are used to perform a partial search on the table. Accordingly, matching authentication data is searched for, and the degree of match is also calculated.

In step S212, the printer 110 determines whether or not any of the matched authenticators in the table has a degree of match equal to or greater than a reference value with the partial code for authentication. The temporary authenticator that is the source of a partial code for authentication is generated by a hash function, and has almost random bit patterns. For this reason, in order to avoid erroneous authentication in which a user is mistaken for a different user, it can be assumed that the authentication was successful when patterns of sufficient length match in comparison to the square of the number of the users. Assuming that a system includes hundred-thousand users and a temporary authenticator has 160 bits, the probability of matching by chance when 48 bits or more are matched is as low as one in twenty-eight thousands (i.e., about 100,000*100,000/281,000,000,000,000,000) when each of the all users uses the printer 110 one time. Accordingly, the reference may be set to 48 bits or more. Note that the reference may be determined depending on the level of security required in a specific application.

When it is determined that the matched length is not sufficient for authentication and none of the matched authenticators has a degree of match equal to or greater than a reference value ("NO" in step S212), the process shifts to step S213. In step S213, the printer 110 determines whether or not the entirety of the code for authentication has been received. When the printer 110 determines that the entirety of the code for authentication has not been received ("NO" in step S213), the process returns to the step S209, and the printer 110 waits for additional vibration patterns. On the other hand, when the printer 110 determines that the entirety of the code for authentication has been received ("YES" in step S213), it is determined that the authentication is a failure in step S215 because there is no further possibility for successful authentication. When the printer 110 determines that the matched authenticators in the table has a degree of match equal to or greater than a reference value with the partial code for authentication before the entirety of the code for authentication is received ("YES" in step S212), the printer 110 determines that the authentication is successful in a step S214. By so doing, it becomes possible to complete the authentication processes before the entirety of the transmittal code is received.

In the user authentication processes according to the first example embodiment described above, the printer 110 uses proximity sensor 118 to sense that the mobile information terminal 150 is approaching the printer 110, and generates a source code for user authentication processes. Then, the printer 110 uses the vibrator 114 to generate vibration patterns based on the generated codes. The vibration patterns generated by the vibrator 114 as above are detected by the vibration sensor 154 of the mobile information terminal 150.

The mobile information terminal 150 generates a code for authentication based on the detected source code, the uses the vibrator 156 to generate vibration patterns based on the generated code for authentication. The vibration patterns generated by the vibrator 156 as above are detected by the vibration sensor 116 of the printer 110. The printer 110 performs user authentication by specifying the user indicated by at least some code of the detected authenticator and verifying the authenticator.

[Modification of First Example Embodiment]

In the user authentication as described above, it is undesired, for example, that a user is authenticated by a device other than the target information appliance and a third party uses the device with the authority of the user. Moreover, it is undesired that an unauthorized third party is authenticated by the printer 110 as a particular existing user. When vibration patterns are used for authentication, a known device that is provided for the mobile information terminal 150 cannot shorten the control intervals or detection intervals of the generation and detection of the vibration patterns. For this reason, the communication speed of such a known device may be slowed down, and it may take a long time for authentication.

According to the first example embodiment described above, communication is performed between the printer 110 and the mobile information terminal 150 by using vibration patterns where the range that a signal can reach is limited and a signal can be transmitted only to a contacted communication unit or a signal can be received only from a contacted communication unit. Accordingly, false authentication on the device side and the terminal side, for example, cases in which a user trying to be authenticated by the printer 110 with the mobile information terminal 150 is authenticated by a different device by error, can be prevented, and the tampering of the communication as desired by an external attacker can also be prevented.

Even if the communication is intercepted by a third party, it is difficult to decode the authentication data because a temporary authenticator is valid only temporarily and a hash function has difficulty in inverse operation. Moreover, when date data is used as an input for a hash function as in a particular embodiment of the present invention, it is even more difficult to decode the authentication data. This is because when a temporary authenticator of appropriate fixed bit length is used, it is impossible to decode the authenticator with realistic computational resource within the effective period of the date data.

As described above, with the authentication system according to the first example embodiment, the security of the communication channel between the mobile information terminal 150 carried by a user and the printer 110 is improved, and the length of time required for the successful completion of authentication processes through the communication channel can be shortened.

[Modification of First Example Embodiment]

In the first example embodiment described above, every time authentication procedure is to be started, the authenticators of all the user are prepared based on the authenticator generation code generated on the printer 110 side. Such a configuration is effective, in particular, for a small-scale or medium-scale organization. However, for a large-scale organization or public use, for example, in convenience stores, the load of generating a table as described above may become too large as such load increases by the square of the number of users. An example modification in which the range of a table to be generated is limited and the load of generating the table is reduced is described below.

FIG. 7A illustrates an example of the data structure of authentication DB used by the authentication print system 100 according to the modification of the first example embodiment of the present invention. FIG. 7B illustrates an example of the data structure of a table of temporary authenticators and the corresponding data used by the authentication print system 100 according to the modification of the first example embodiment of the present invention. In a similar manner to the first example embodiment described above, the authentication DB depicted in FIG. 7A includes all the authentication data registered in the authentication DB 222. In the present example modification, a password is added to the tail end of each of the user IDs in the authentication data.

In the present example modification, the mobile information terminal 150 firstly generates a search reference value based on the authenticator generation code received from the printer 110. Secondly, the mobile information terminal 150 compares the generated search reference value with the user ID included in the authentication data stored in the authentication data storage unit 258, and adds the result of the comparison to the head of the generated code for authentication. Then, the mobile information terminal 150 transmits the code for authentication to the printer 110 as vibration patterns. Here, the result of the comparison indicates whether each of the user IDs included in the authentication data is greater or smaller than the search reference value.

On the other hand, the printer 110 also generates a search reference value based on the authenticator generation codes generated by the generation-code generator 214, in a similar manner to the mobile information terminal 150 as described above. In the present example modification, the generation of a table in the step S207 as illustrated in FIGS. 4A and 4B does not start immediately after the generation of the authenticator generation code. Instead, the printer 110 extracts the result of the comparison when the reception of a code corresponding to the result of the comparison is complete while receiving a code for authentication, and generates a table of the temporary authenticators for only the authentication data of the user IDs specified by the result of the comparison. In the example depicted in FIG. 7B, the table is generated only for the authentication data where the head of the user ID is less than seven.

As the search reference value is generated in the same way as mobile information terminal 150, the same value is output for the generated authenticator generation code by the mobile information terminal 150 and the printer 110. For this reason, it becomes possible for the printer 110 to specify group of authentication data that includes the authentication data of the user of the mobile information terminal 150, based on the result of the comparison. The steps after the table is generated are equivalent to those of the first example embodiment described above.

According to the present example modification described above, the load of generating the table is reduced as the table of temporary authenticators is generated only for the specified authentication data, and the length of time required for the authentication can also be reduced. In particular, the example modification is effectively applied when the number of users is enormously large. Moreover, as a search reference value is generated based on the authenticator generation code, the range of the table of temporary authenticators can efficiently be limited even if the user IDs are biased compared with cases in which the search reference value is fixed. In the example embodiment described above, a single search reference value is used. However, a plurality of search reference values and a plurality of results of comparison may be used, for example, for the first two digits of each of the user IDs, to further limit the range in which the table is to be generated.

[Second Example Embodiment]

The first example embodiment has been described as above with reference to the authentication print system 100 that includes the mobile information terminal 150 carried by a system user and the printer 110 that performs authentication processes, where the operation of the printer 110 is controlled according to a result of the authentication processes. The second example embodiment is described below with reference to the authentication print system 100 that includes the mobile information terminal 150, a plurality of readers 140 and printers 110, and an authentication server 170. The mobile information terminal 150 is carried by a system user, and the readers 140 receive authentication requests. The operation of the printers 110 is controlled according to results of the authentication processes.

FIG. 8 is a diagram illustrating an outline of the configuration of a authentication print system 100 according to the second example embodiment of the present invention. As illustrated in FIG. 8, the authentication print system 100 according to the second example embodiment of the present invention includes a plurality of printers 110a to 110z that cannot be used unless authenticated, readers 140a to 140z provided for the respective printers 110a to 110z, an authentication server 170 connected to the printers 110a to 110z through a network 102, and the mobile information terminal 150 carried by a user.

In the authentication print system 100 according to the second example embodiment of the present invention, the interfaces with the mobile information terminal 150 are the readers 140 that are provided for the respective printers 110 to communicate with the associated printers 110, and each of the readers 140 is an authentication device that receives an authentication request. When the mobile information terminal 150 is placed on the reader 140 provided for the printer 110, the reader 140 and the mobile information terminal 150 can communicate with each other as the communication units of the printer 110 and the mobile information terminal 150 contact. Data for authentication is exchanged between the reader 140 and the mobile information terminal 150 through mechanical vibration patterns. The readers 140 are connected with the printers 110, for example, through universal serial buses (USBs), and the printers 110 communicate with the authentication server 170 through the network 102 to perform user authentication.

Figure 9:
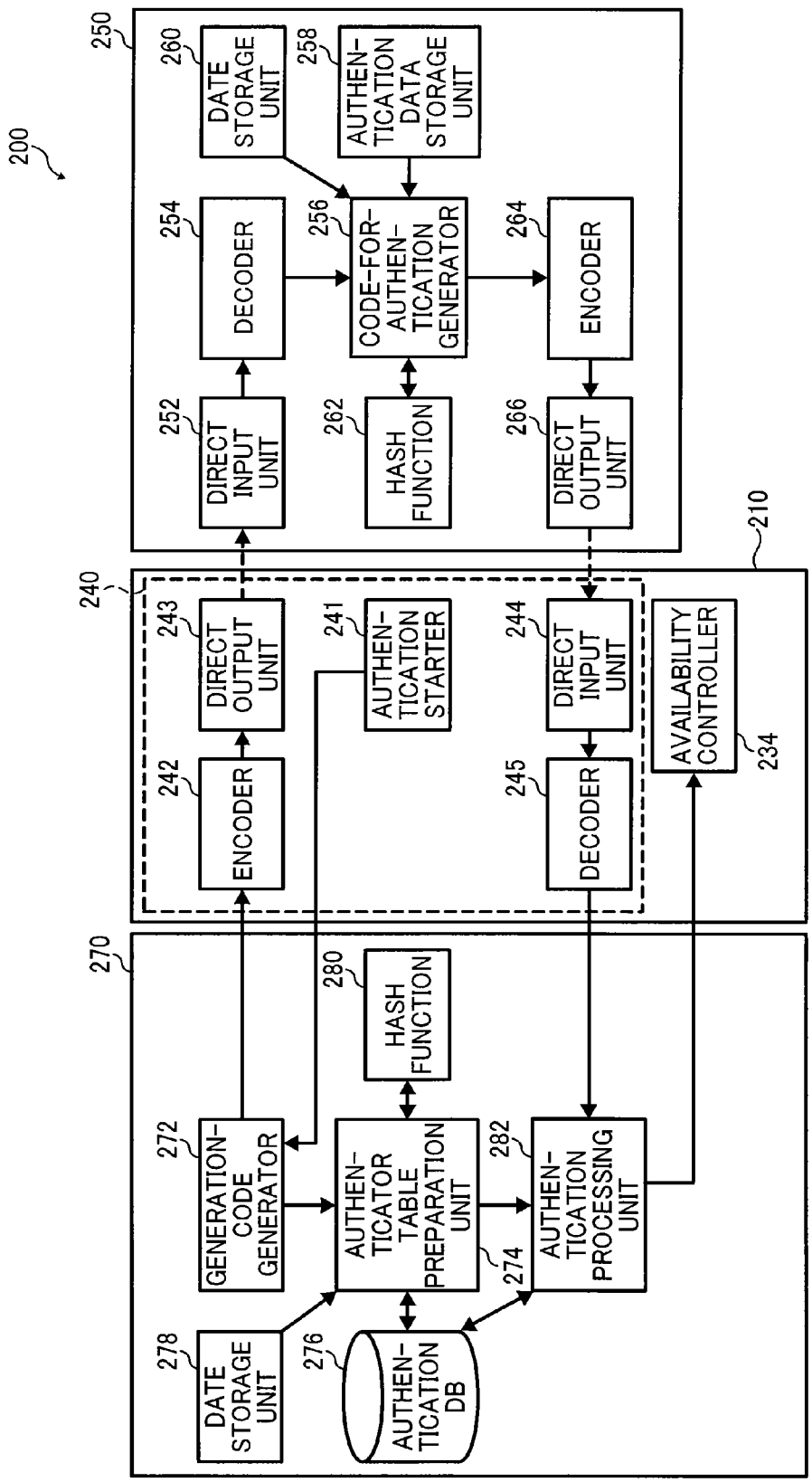
FIG. 9 is a functional block diagram of an authentication print system according to a second example embodiment of the present invention.

FIG. 9 is a functional block diagram of the authentication print system 100 according to the second example embodiment of the present invention. The functional blocks 210, 240, 250, and 270 of the printer 110, the reader 140, the mobile information terminal 150, and the authentication server 170, respectively, are described below with reference to FIG. 9.

As illustrated in FIG. 9, the functional blocks 210 of the printer 110 according to the second example embodiment of the present invention includes an availability controller 234. The functional blocks 240 of the reader 140 according to the second example embodiment of the present invention includes an authentication starter 241, an encoder 242, a direct output unit 243, a direct input unit 244, and a decoder 245. The functional blocks 270 of the authentication server 170 according to the second example embodiment of the present invention includes a generation-code generator 272, an authenticator table preparation unit 274, an authentication DB 276, a date storage unit 278, a hash function 280, and an authentication processing unit 282. The functional blocks 250 of the mobile information terminal 150 according to the second example embodiment of the present invention are equivalent to those of the first example embodiment.

The generation-code generator 272 of the authentication server 170 according to the second example embodiment generates a at least one authenticator generation code in advance. The authenticator table preparation unit 274 prepares the table of temporary authenticators for all the users of the printer 110 based on the at least one of authenticator generation codes that are generated in advance by the generation-code generator 272.

The generation-code generator 272 of the authentication server 170 transmits an authenticator generation code to be used for the ongoing authentication to the encoder 242 of the reader 140, in response to the instructions for starting authentication sent from the authentication starter 241 of the reader 140. The communication between the reader 140 and the authentication server 170 is performed by the communication I/F through the printer 110.

The encoder 242 of the reader 140 encodes the authenticator generation code received from the generation-code generator 272 of the authentication server 170. The direct output unit 243 converts the authenticator generation code encoded by the encoder 242 into an electrical signal, and drives the vibrator to transmit vibration patterns to the mobile information terminal 150.

The direct input unit 244 of the reader 140 drives the vibration sensor to sense the vibration patterns of the mobile information terminal 150, and converts the detected vibration patterns into an electrical signal. The decoder 245 reproduces the embeded clock from the received signal of the vibration patterns to decode the code, and performs error detection and error correction based on the added redundancy. Then, the decoder 245 transmits the obtained code to the authentication processing unit 282 of the authentication server 170 as necessary.

FIG. 10 illustrates an example of the data structure of a table of temporary authenticators and the corresponding data used by the authentication print system 100 according to the second example embodiment of the present invention. As depicted in FIG. 10, the table that is prepared by the authenticator table preparation unit 274 according to the second example embodiment includes all the authentication data registered in the authentication DB 222, the temporary authenticators generated from the registered authentication data, and flags that indicate whether the temporary authenticators are valid or invalid. Note that the table is paired with at least one generated authenticator generation code.

The authentication processing unit 282 matches at least some of the code for authentication, which is received by the direct input unit 244 of the reader 140 as vibration patterns and then is decoded by the decoder 245, and is transmitted to the authentication processing unit 282 through a communication I/F as necessary, with the table of the temporary authenticator that is prepared by the authenticator table preparation unit 274 and then is stored in the authentication DB 276, to determine whether or not the authentication is successful. In a similar manner to the example embodiment described above, whether or not the authentication is successful is determined based on the degree of match between some of the code for authentication that is received as necessary and the temporary authenticators in the table, in the second example embodiment described herein.

When determined that the authentication was successful, the authentication processing unit 282 according to the second example embodiment sets the flag that corresponds to the matched authenticator to "true" in the table of the transmitted authenticator generation code. Accordingly, the authenticator is invalidated. Such an invalidated authenticator cannot be used any longer. For example, even if an attacker that has intercepted the temporary authenticator transmitted from the mobile information terminal 150 transmits the same temporary authenticator, or even if the same authenticator generation code is transmitted to, the authentication ends in failure. When an authentication request is sent from a different mobile information terminal to another printer (e.g., a printer separate from the printer to which an authentication request was sent from the first user), the generation-code generator 272 may transmit the same authenticator generation code. When the same authenticator generation code is used, the table can be reused.

The availability controller 234 according to the second example embodiment of the present invention controls the user interface provided on the operation panel 124 of the printer 110 according to the result of the authentication processes performed by the authentication processing unit 282 of the authentication server 170, and provides an authenticated user with access to the functions.

If the same authenticator generation code is successively transmitted from the same printer 110, the temporary authenticator is already invalidated for the same user. Accordingly, the authentication requested by the user ends in failure even if the authentication data is authentic, and the user is required to repeat the procedure. This may lower the customer convenience. In view of the above circumstances, it may be configured such that the same printer according to the present example embodiment basically does not successively transmit the same authenticator generation code. On the other hand, a printer that is sufficiently distant and is not likely to be used by the same user according to the position information of the printers may be configured to reuse the table and transmit the same authenticator generation code that has already been transmitted to the user. Due to such a configuration, the table may be reused, and the customer convenience does not suffer even when the same user is up to the authentication for the second time.

According to the second example embodiment described above, the authentication server 170 is shared among the multiple printers 110 and the table is reused. Thus, the load of generating a table can be reduced as a whole. According to the second example embodiment described above, the authentication processes of the multiple printers 110 are performed by a single authentication server in an integrated manner. Accordingly, an increase in the load of generating a table and the length of time required to perform authentication processes due to the increased scale can be attenuated by reusing the table among the multiple printers 110. Moreover, the controllability or convenience improves as the user data of a plurality of printers is shared.

According to the example embodiments described above, an authentication system and authentication method can be provided in which the security of the communication channel between a mobile device carried by a user and an authentication device that authenticate the mobile device is improved.

In the example embodiments described above, temporal patters in mechanical vibration are used as patterns that are transmitted. However, no limitation is indicated therein, and the transmitted patterns may include spatial components generated by a plurality of channels.

The functional part as described above is realized by a computer-readable program written by legacy programming language or object-oriented programming language such as assembler language, C language, C++ language, C# language, and Java (registered trademark), and the program can be distributed via telecommunication line or upon being written on a computer-computer-readable recording medium such as ROM, electrically erasable and programmable read only memory (EEPROM), electrically programmable read only memory (EPROM), flash memory, flexible disk, compact disc read only memory (CD-ROM), compact disc rewritable (CD-RW), digital versatile disk (DVD)-ROM, DVD-RAM, DVD-RW, Blu-ray disc, secure digital (SD) card, and magneto-optical disc (MO).

Embodiments of the present invention has been described above, but the present invention is not limited to those embodiments and various applications and modifications may be made without departing from the scope of the invention.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. An authentication system comprising:
a mobile device including mobile device circuitry configured to
store authentication data of a user,
generate a code for authentication using a prescribed code and the authentication data,
control generation of a mechanical vibration pattern based on the code for authentication,
control sensing of a mechanical vibration pattern to obtain the prescribed code,
generate a search reference value based on the prescribed code,
compare the generated search reference value with a user identifier included in the authentication data to output a comparison result, and
add the comparison result to the code for authentication to be output; and
an authentication device configured to authenticate the user at the mobile device, the authentication device including
a proximity sensor configured to detect the mobile device when the mobile device is within a proximate distance of the authentication device, and
authentication device circuitry configured to
output the prescribed code to be used for generating the code for authentication in response to detection of the mobile device by the proximity sensor,
control generation of a mechanical vibration pattern that is transmitted to the mobile device, based on the prescribed code,
control sensing of a mechanical vibration pattern that is received from the mobile device,
obtain the code for authentication based on the received mechanical vibration pattern
obtain authentication data of one or more registered users from a memory, and generate an authenticator for each one of the one or more registered users, by using the prescribed code and authentication data of corresponding one of the one or more registered users, and
match the code for authentication output from the mobile device with the authenticator that is generated for each one of the one or more registered users to determine whether the user at the mobile device is authenticated.

2. The authentication system according to claim 1, wherein the authentication device circuitry is further configured to generate an authenticator generation code as the prescribed code.

3. The authentication system, according to claim 2, wherein
the authentication device circuitry is further configured to obtain synchronization information, the authenticator being generated from the synchronization information, the authenticator generation code, and the authentication data,
the mobile device circuitry is further configured to obtain synchronization information, the code for authentication being generated from the synchronization information, the authenticator generation code received from the authentication device, and the authentication data of the user, and
the authentication device circuitry and the mobile device circuitry output a same value for a prescribed period of time.

4. The authentication system according to claim 3, wherein the authentication device circuitry and the mobile device circuitry output date data of when the authentication started as the synchronization information.

5. The authentication system according to claim 1, wherein the authentication device circuitry is further configured to detect an event that triggers detection of the mobile device.

6. The authentication system according to claim 1, wherein the authentication device circuitry is further configured to determine whether or not the user at the mobile device is authenticated based on a degree of match between at least a portion of the code for authentication and the authenticator of each one of the one or more registered users.

7. The authentication system according to claim 6, wherein the authentication device circuitry is further configured to determine, for at least one of the authenticators of the one or more registered users, whether the authenticator matches the code for authentication to a prescribed degree before an entirety of the code for authentication is obtained from the mobile device, and determines that the user at the mobile device is authenticated when there is at least one authenticator that matches the code for authentication to the prescribed degree.

8. The authentication system according to claim 1, wherein
the authentication device and the mobile device exchange data through a communication channel where a signal is transmitted or received only when the mobile device is made in contact with or near the authentication device.

9. The authentication system according to claim 1, wherein
the authentication device further includes a light emitting element configured to emit an optical pattern based on the prescribed code, and
the mobile device includes a light receiving element configured to receive the optical pattern emitted by the light emitting element to obtain the prescribed code.

10. The authentication system according to claim 1, wherein
the mobile device includes a light emitting element configured to emit an optical pattern based on the code for authentication, and
the authentication device includes a light receiving element configured to receive the optical pattern to obtain the code for authentication.

11. The authentication system according to claim 1, wherein
the authentication device circuitry is further configured to generate the authenticator for each one of the one or more registered users in advance using the prescribed code, and
when it is determined that the user at the mobile device is authenticated, the the circuitry is configured to invalidate the prescribed code for the authenticator that matches the code for authentication, while keeping a pair of the prescribed code and the authenticator for the one or more registered users other than the authenticated user for later use.

12. The authentication system according to claim 1, wherein
the authentication device circuitry is further configured to generate a search reference value using the prescribed code,
extract the comparison result from the code for authentication, and
determine a range of the authentication data for which the authenticator is to be generated based on the search reference value generated at the authentication device and the comparison result extracted from the code for authentication.

13. The authentication system according to claim 1, wherein the prescribed code is generated using a prescribed function that is a hash function that has at least the prescribed code and the authentication data as an input value and the authenticator or the code for authentication as an output value.

14. The authentication system according to claim wherein the authentication device includes:
a server; and
a device that operates under control of the server based on an authentication result output by the server.

15. An authentication device comprising:
a proximity sensor configured to detect a mobile device when the mobile device is within a proximate distance of the authentication device; and
circuitry configured to
output a prescribed code in response to detection of mobile device by the proximity sensor,
control generation of a mechanical vibration pattern that is transmitted to the mobile device, based on the prescribed code,
control sensing of a mechanical vibration pattern that is received from the mobile device,
obtain a code for authentication based on the received mechanical vibration pattern, using the prescribed code and authentication data of a user stored in the mobile device, the code for authentication including a comparison result between a search reference value and a user identifier included in the authentication data, the search reference being generated by the mobile device based on the prescribed code,
obtain authentication data of one or more registered users from a memory,
generate an authenticator for each one of the one or more registered users, by using the prescribed code and authentication data of corresponding one of the one or more registered users, and
match the code for authentication output from the mobile device with the authenticator that is generated for each one of the one or more registered users to determine whether the user at the mobile device is authenticated.

16. An authentication method performed by an authentication device, the method comprising:

detecting a mobile device when the mobile device is within a proximate distance of an authentication device;

generating a mechanical vibration pattern and outputting a prescribed code in response to detection of mobile device through the generated mechanical vibration pattern;

obtaining a code for authentication output from the mobile device through a mechanical vibration pattern that is generated at the mobile device using the prescribed code and authentication data of a user stored in the mobile device, the code for authentication including a comparison result between a search reference value and a user identifier included in the authentication data, the search reference being generated by the mobile device based on the prescribed code;

reading authentication data of one or more registered users from a memory;

generating an authenticator for each one of the one or more registered users, by using the prescribed code and authentication data of corresponding one of the one or more registered users; and matching the code for authentication output from the mobile device with the authenticator that is generated for each one of the one or more registered users to determine whether the user at the mobile device is authenticated.

* * * * *